(12) United States Patent
Sridhara et al.

(10) Patent No.: US 9,070,015 B2
(45) Date of Patent: Jun. 30, 2015

(54) SYSTEM AND METHOD FOR IRIS DETECTION IN DIGITAL IMAGES

(71) Applicant: ITTIAM SYSTEMS (P) LTD., Bangalore (IN)

(72) Inventors: Hamsalekha Sridhara, Bangalore (IN); Srinivasan Ekabaram, Bangalore (IN); Omkar Kedarnath Sastry, Natick, MA (US); Murali Babu Muthukrishnan, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 87 days.

(21) Appl. No.: 13/761,185

(22) Filed: Feb. 7, 2013

(65) Prior Publication Data

US 2014/0219516 A1    Aug. 7, 2014

(51) Int. Cl.
*G06K 9/00*    (2006.01)

(52) U.S. Cl.
CPC ................... *G06K 9/0061* (2013.01)

(58) Field of Classification Search
USPC .............................. 382/117, 167, 190; 348/78
See application file for complete search history.

(56) References Cited

U.S. PATENT DOCUMENTS

| | | | | |
|---|---|---|---|---|
| 7,444,017 B2* | 10/2008 | Gallagher | | 382/167 |
| 7,869,626 B2* | 1/2011 | Ko et al. | | 382/117 |
| 7,936,926 B2* | 5/2011 | Suzuki et al. | | 382/117 |
| 7,970,179 B2* | 6/2011 | Tosa | | 382/117 |
| 8,340,364 B2* | 12/2012 | Tosa | | 382/117 |
| 2006/0147094 A1* | 7/2006 | Yoo | | 382/117 |
| 2007/0025598 A1* | 2/2007 | Kobayashi et al. | | 382/117 |
| 2007/0133879 A1* | 6/2007 | Fukaya et al. | | 382/190 |
| 2008/0232650 A1* | 9/2008 | Suzuki et al. | | 382/118 |
| 2009/0220126 A1* | 9/2009 | Claret-Tournier et al. | | 382/117 |
| 2011/0150334 A1* | 6/2011 | Du et al. | | 382/173 |
| 2014/0226875 A1* | 8/2014 | Lefebvre et al. | | 382/117 |

OTHER PUBLICATIONS

Essam Al-Daoud, A new iris localization method based on the competitive chords, Sep. 10, 2010, Springer-Verlag London Limited, p. 548-555.*

* cited by examiner

*Primary Examiner* — Nirav G Patel
*Assistant Examiner* — Ian Lemieux
(74) *Attorney, Agent, or Firm* — Prakash Nama; Global IP Services, PLLC

(57) ABSTRACT

A system and a method for iris detection in a face region of a digital image are disclosed. In one embodiment, iris is detected in the face region of the digital image using eye features, such as a shape of the iris and/or luminance values of a sclera region.

30 Claims, 9 Drawing Sheets

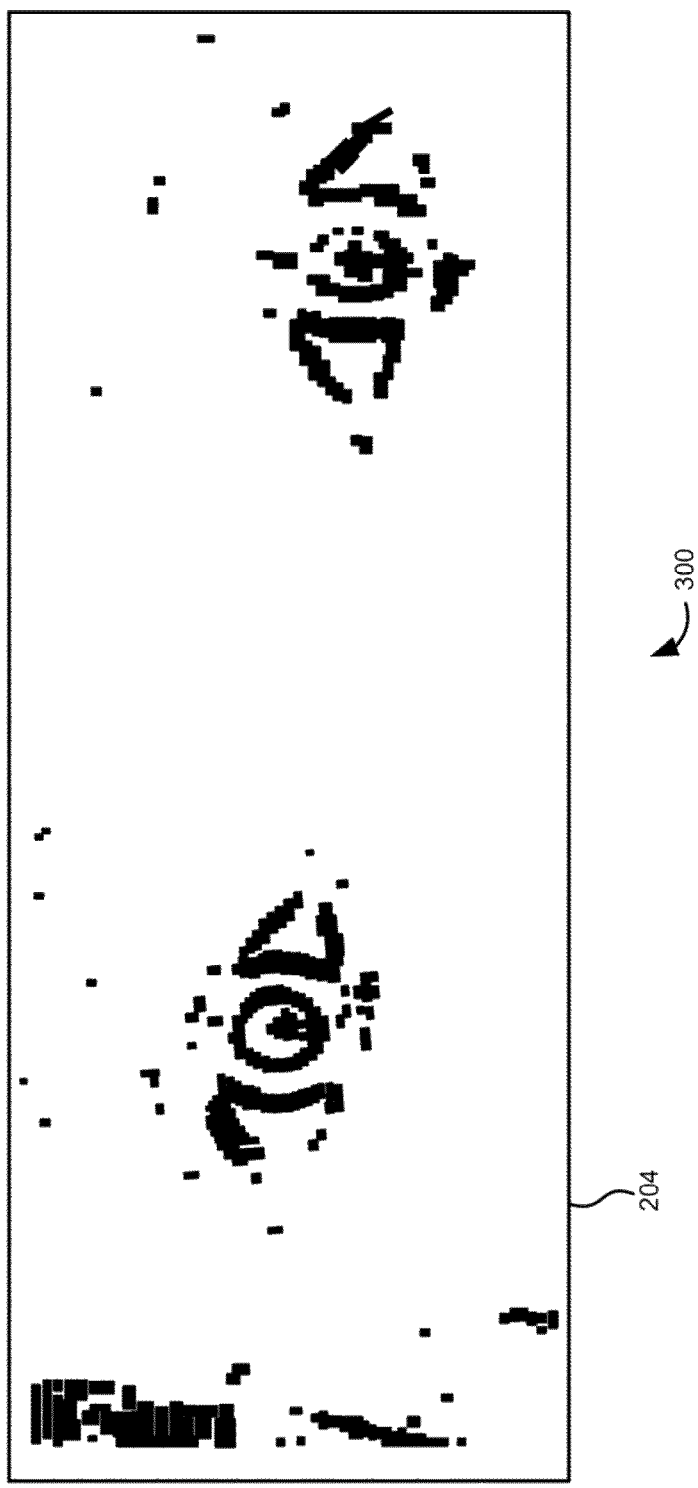

SYSTEM AND METHOD FOR IRIS DETECTION IN DIGITAL IMAGES

TECHNICAL FIELD

Embodiments of the present subject matter relate to digital image processing. More particularly, embodiments of the present subject matter relate to a system and method for robust iris detection in digital images.

BACKGROUND

In recent years, iris detection in a face region of a digital image is becoming more and more important in various applications, such as red-eye detection and correction, iris recognition, security systems, and so on. Although, numerous existing techniques are used for iris detection, they suffer either from poor detection rates due to variations in brightness levels, different color characteristics of iris and partially closed iris. Also, the existing techniques suffer from high processing needs that make real-time iris detection unrealistic on embedded devices.

BRIEF DESCRIPTION OF THE DRAWINGS

Various embodiments are described herein with reference to the drawings, wherein:

FIG. 3 illustrates edges detected in the predetermined region, such as the one shown in FIG. 2, according to one embodiment;

The drawings described herein are for illustration purposes only and are not intended to limit the scope of the present disclosure in any way.

DETAILED DESCRIPTION

A system and method for iris detection in digital images are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
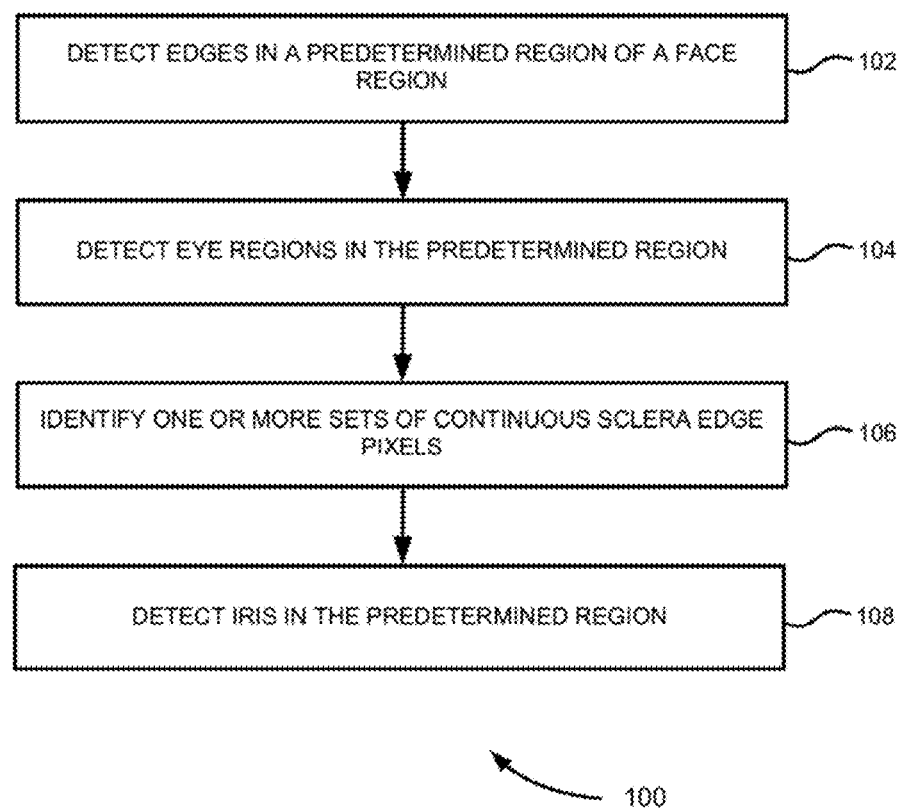
FIG. 1 illustrates a flowchart of a method for iris detection in a digital image, according to one embodiment.
Figure 2:
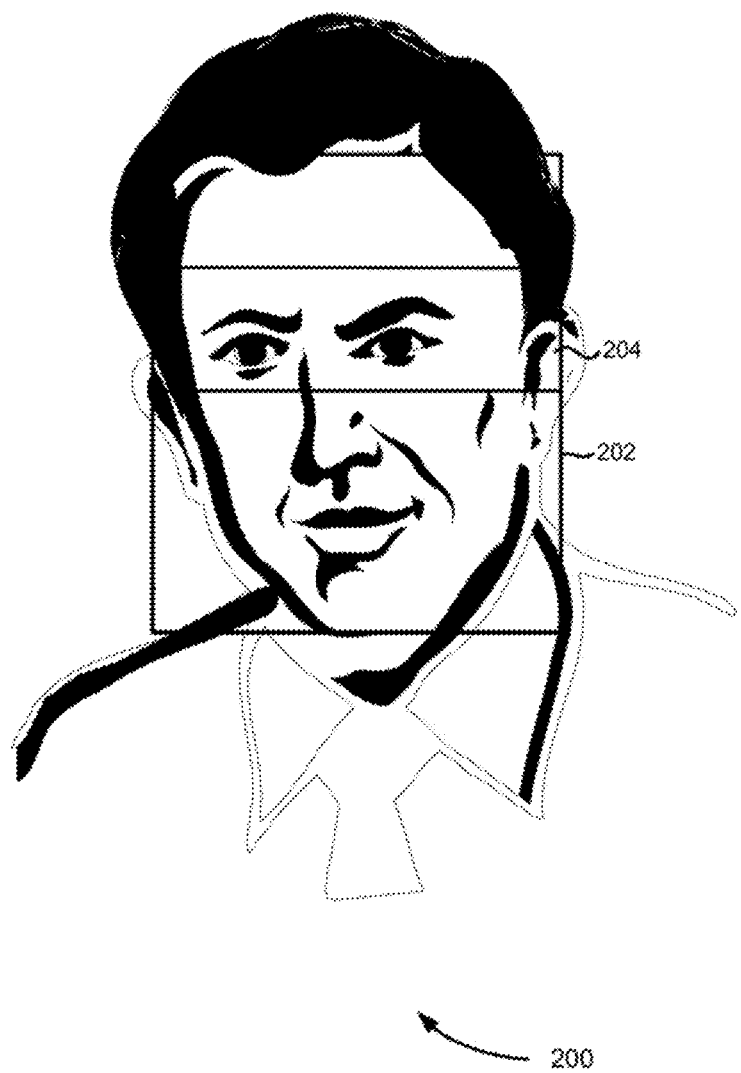
FIG. 2 illustrates a predetermined region of a face region in the digital image, used for detecting the iris, according to one embodiment.

FIG. 1 illustrates a flowchart 100 of a method for iris detection in a digital image, according to one embodiment. In one embodiment, iris, in a face region of the digital image, is detected using eye features, such as a shape of the iris, luminance values of a sclera region and the like. In this embodiment, at block 102, edges in a predetermined region of the face region are detected. For example, the predetermined region is from about 25% to about 50% of the face region (e.g., a predetermined region 204, in a face region 202 of a digital image 200, of FIG. 2). In one exemplary implementation, the edges are detected in four directions, such as vertical, horizontal and two diagonal directions in the predetermined region. For example, the edges are detected in the predetermined region using a threshold value obtained adaptively from a histogram of luminance values within the predetermined region (see FIG. 3). For example, the threshold value is obtained adaptively using an equation:

$$T_{eye} = \text{Scale\_Y\_factor}_{eye} * (t_{y2} - t_{y1})$$

wherein, $\text{Scale\_Y\_factor}_{eye} = 2.5$, $t_{y2}$=luminance value (Y) at 75% of the histogram, and
$t_{y1}$=Y value at 25% of the histogram.

Figure 4A:
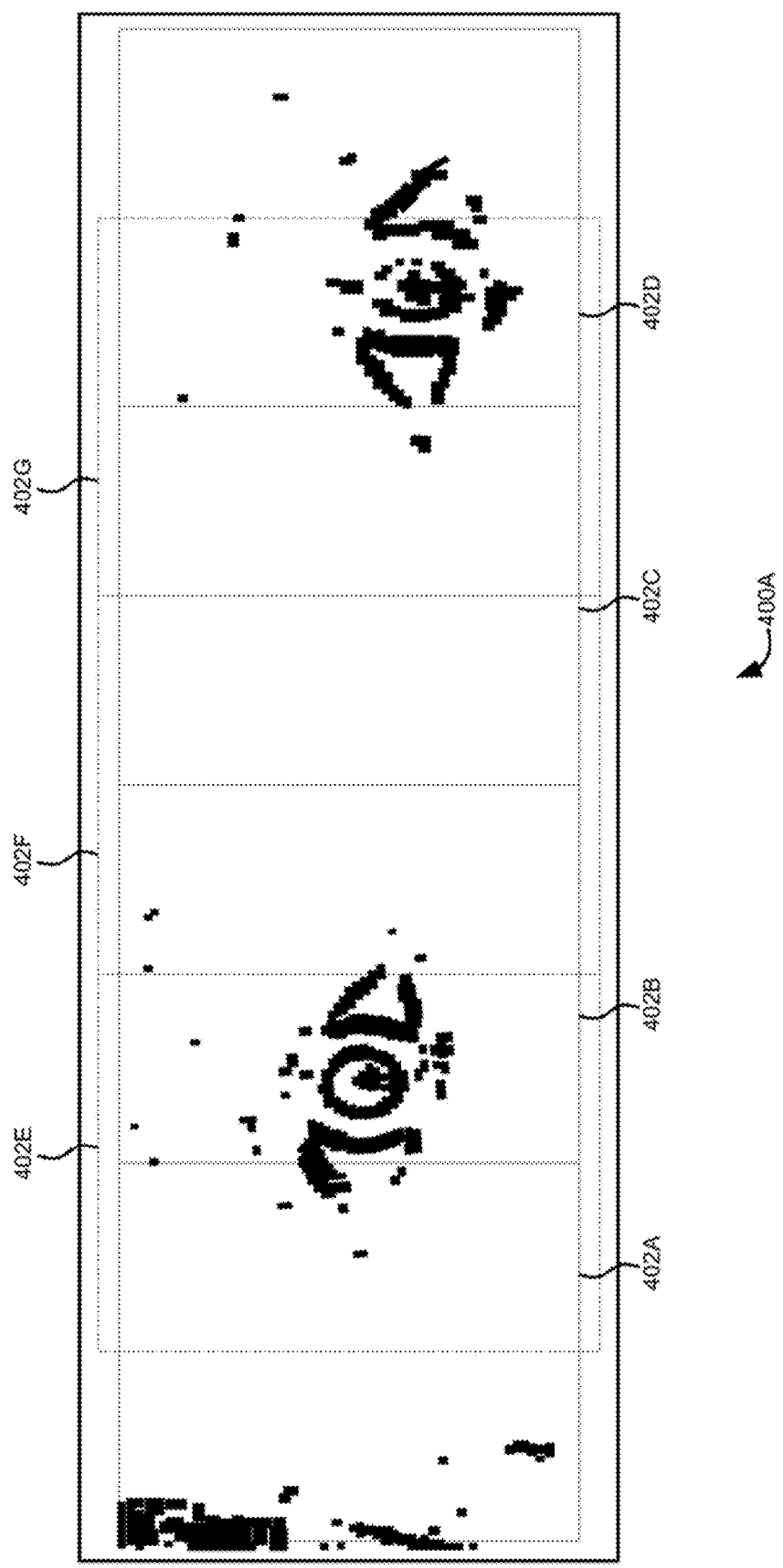
FIG. 4A illustrates multiple overlapping windows in the predetermined region, according to one embodiment.
Figure 4B:
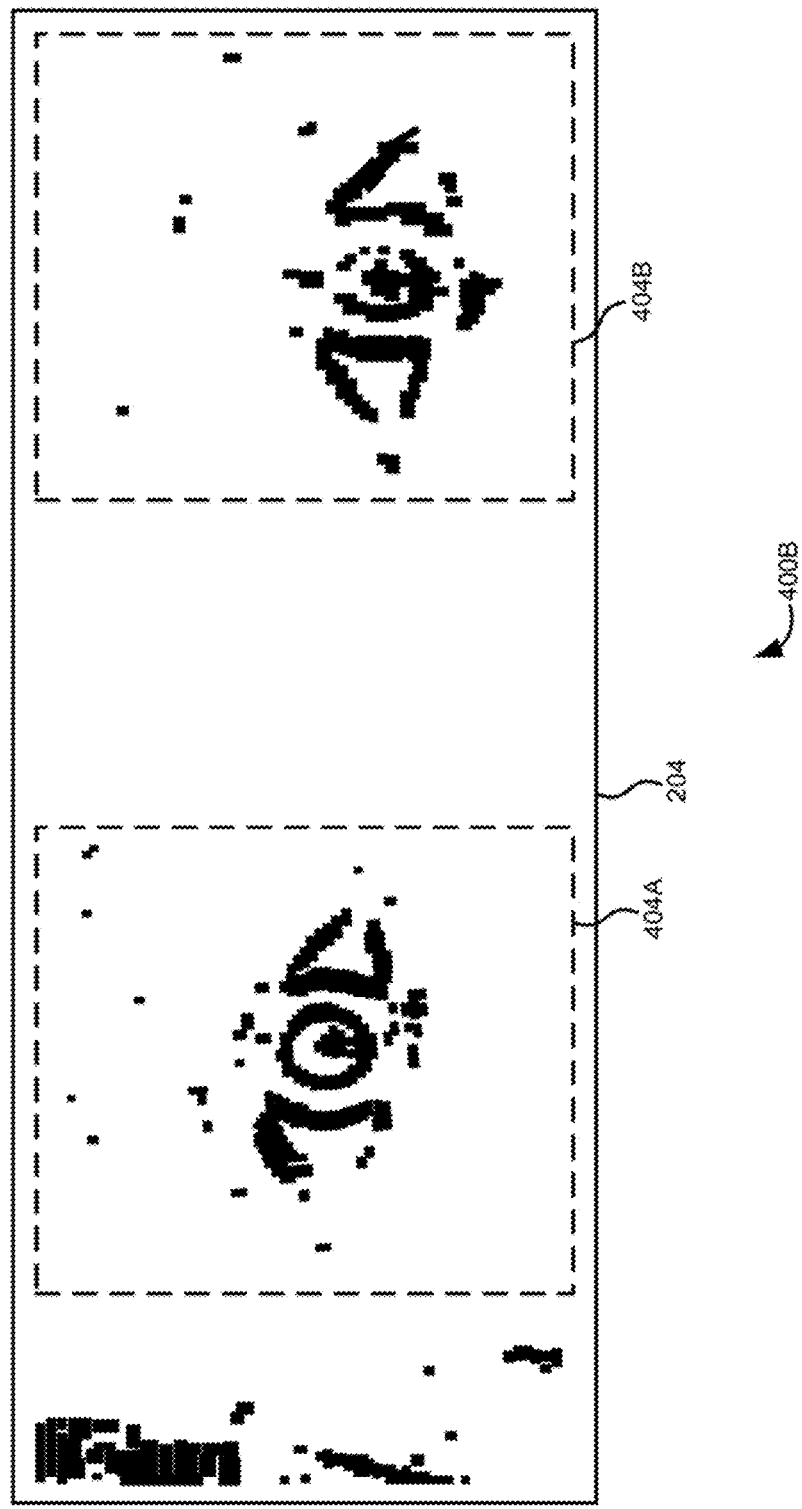
FIG. 4B illustrates eye regions detected based on the edges from the multiple overlapping windows, such as those shown in FIG. 4A, according to one embodiment.

At block 104, eye regions are detected in the predetermined region based on the detected edges. In one embodiment, the predetermined region is partitioned into multiple overlapping windows (e.g., multiple overlapping windows 402A-G of FIG. 4A). Further, a number of the detected edges in each overlapping window is determined. Furthermore, two of the multiple overlapping windows (e.g., the overlapping windows 402E and 402D of FIG. 4A) having a maximum number of the detected edges are identified and declared as the eye regions (e.g., eye regions 404A-B of FIG. 4B). For example, the overlapping window having the maximum number of detected edges is identified in each half of the face region 202 and declared as the eye region.

At block 106, one or more sets of continuous sclera edge pixels are detected in the eye regions. In one embodiment, sclera pixels are detected in the eye regions (e.g., sclera pixels, shown in light grey color, of FIG. 5). For example, the sclera pixels in the eye regions are detected using an adaptive threshold value ($T_{SCLERA}$) derived from a histogram of luminance values within the eye regions. In one example, any pixel whose luminance value is greater than the threshold value based on the histogram is declared as the sclera pixel. The threshold value for the sclera pixels is obtained using an equation:

$$T_{SCLERA} = (Y_{SCR\%})$$

wherein, $Y_{SCR\%}$=Y value at which 85% of the histogram is covered.

Figure 5:
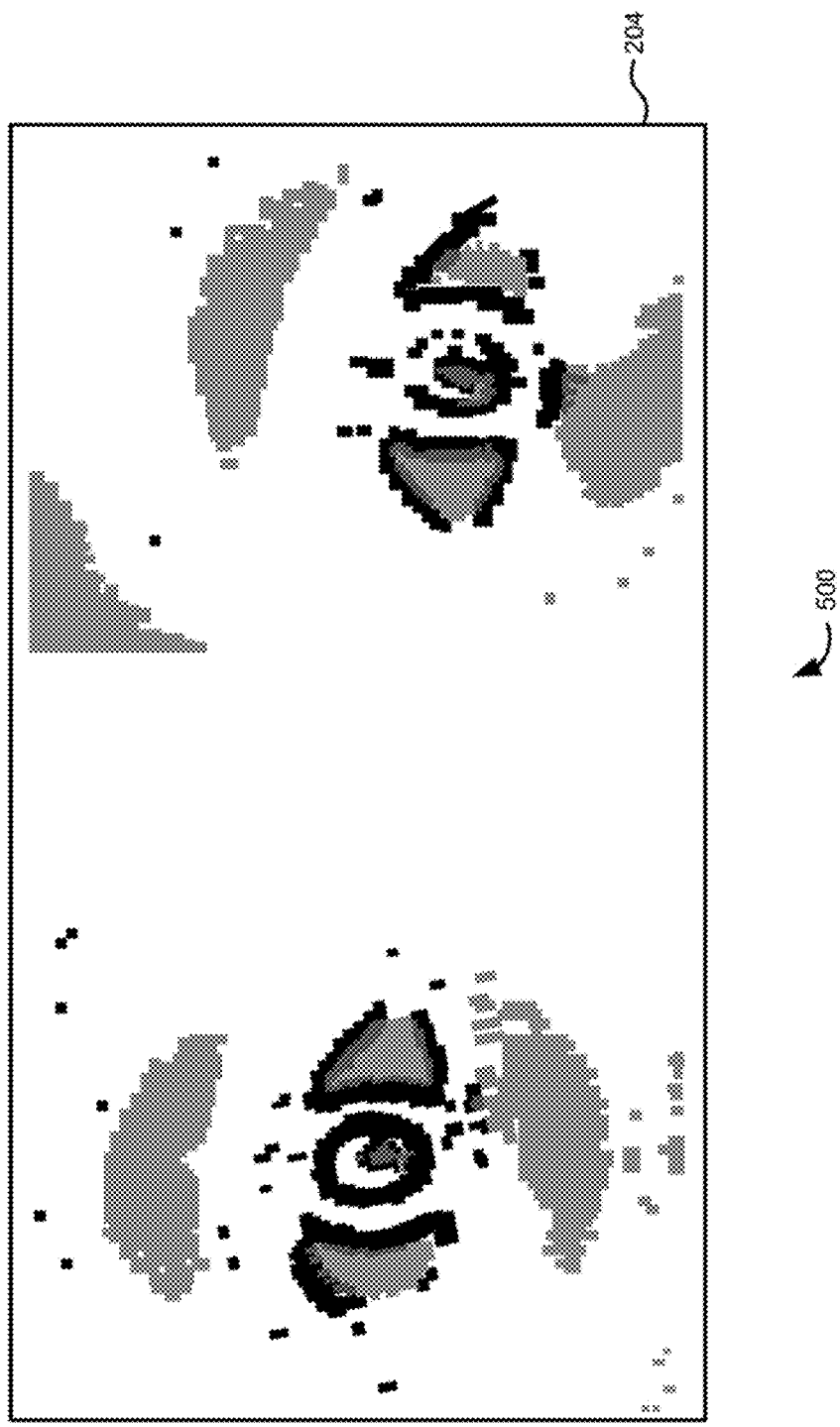
FIG. 5 illustrates sclera pixels and sclera edge pixels that are next to the detected edges identified in the eye regions, such as those shown in FIG. 4, according to one embodiment.
Figure 6:
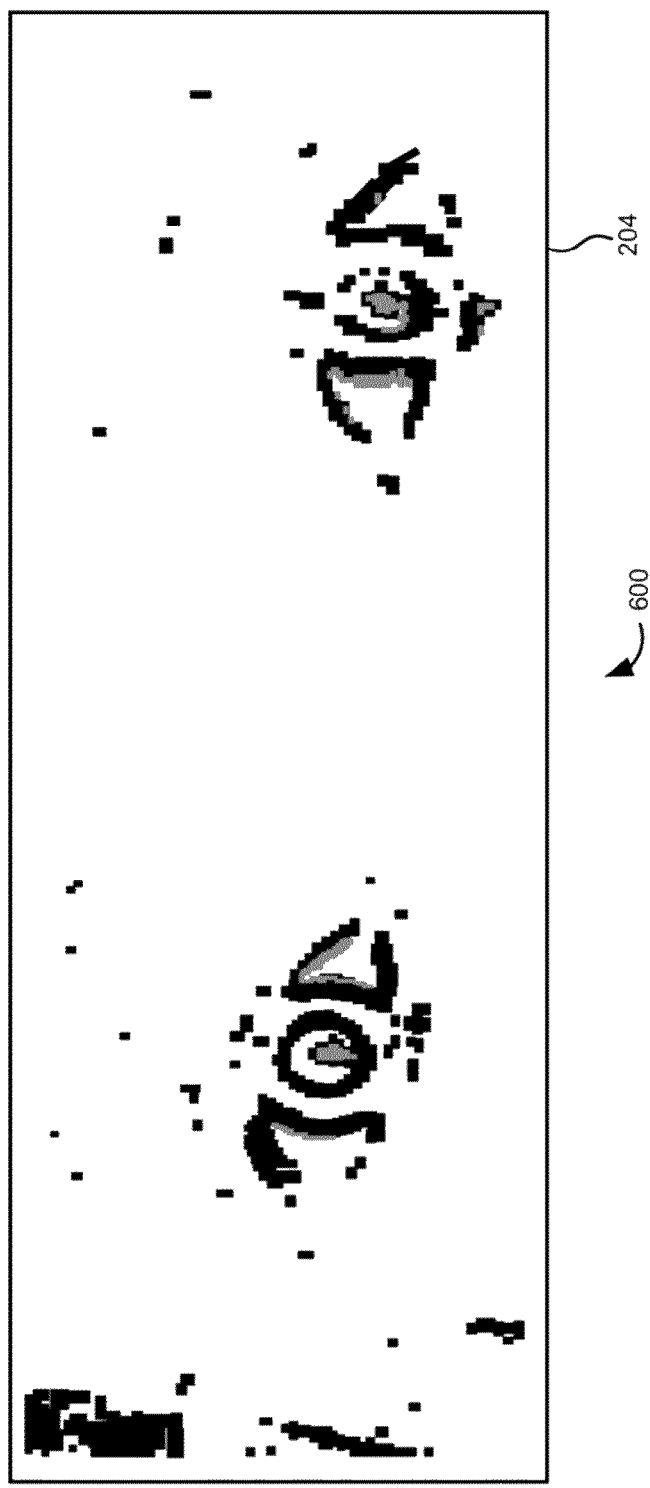
FIG. 6 illustrates one or more sets of continuous sclera edge pixels identified from the sclera edge pixels, such as those shown in FIG. 5, according to one embodiment.

Further, sclera edge pixels are identified from the detected sclera pixels (e.g., sclera edge pixels, shown in dark grey color, of FIG. 5). The sclera edge pixels are the sclera pixels that are next to the edges. Furthermore, the one or more sets of continuous sclera edge pixels are identified from the identified sclera edge pixels. In one exemplary implementation, the one or more sets of continuous sclera edge pixels are identified using an n×m filter that detects sclera edge pixels in its top and bottom portions. For example, the n×m filter is a 7×3 filter, centered on a sclera edge pixel, which checks for a predetermined number of sclera edge pixels in top 3×3 and bottom 3×3 portions. In one example embodiment, the predetermined number is one. Further, the sclera edge pixel on which the filter is centered is marked as a continuous sclera edge pixel, if the number of sclera edge pixels in the top and bottom 3×3 portions of the filter exceeds the predetermined number. The above process is repeated for each sclera edge pixel. In context, the one or more sets of continuous sclera edge pixels, that represent iris contours, are identified using the n×m filter in the vertical direction and remaining sclera edge pixels are eliminated (e.g., one or more sets of continuous sclera edge pixels, shown in dark grey, of FIG. 6).

Figure 7:
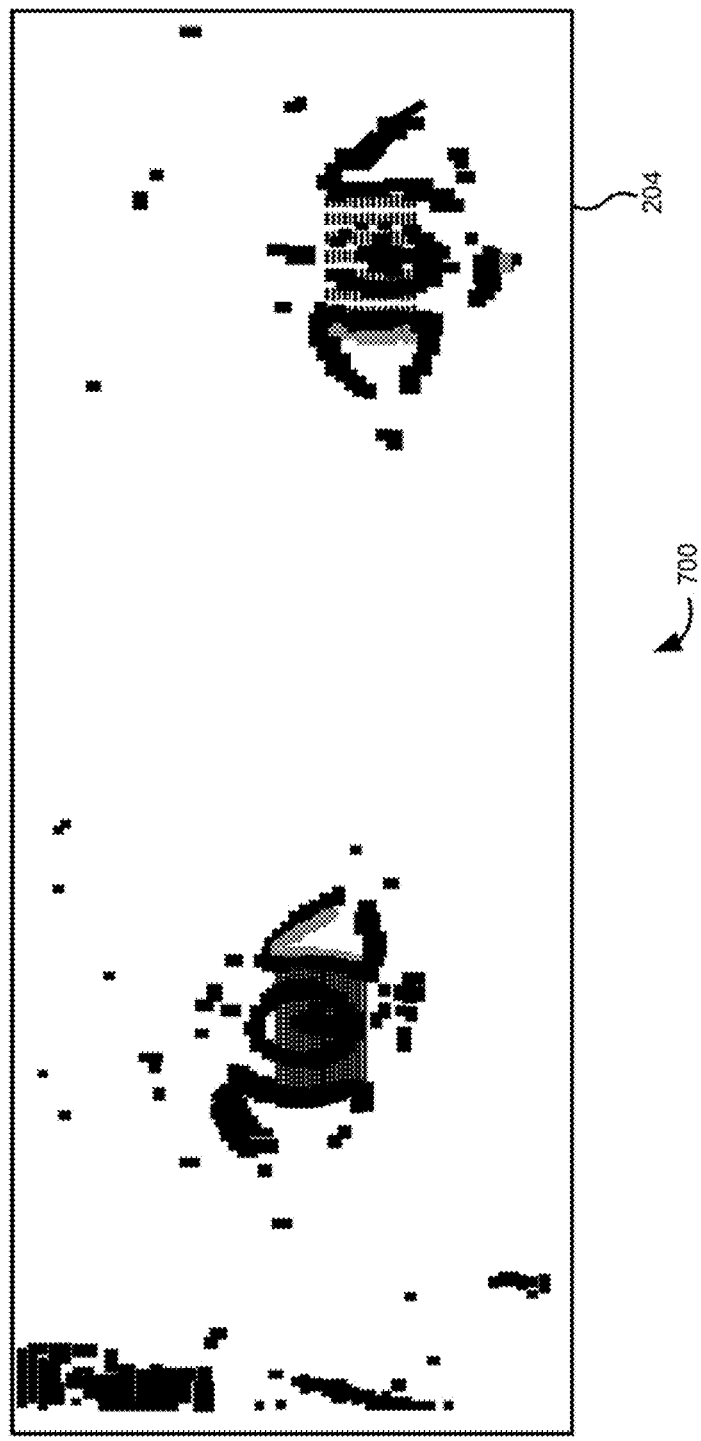
FIG. 7 illustrates chords used for detecting the iris in the predetermined region, according to one embodiment.

At block 108, the iris is detected in the predetermined region using the one or more identified sets of continuous sclera edge pixels. In one embodiment, chords are drawn starting from edges that are adjacent to the one or more identified sets of continuous sclera edge pixels and ending on edges (see FIG. 7). In one example embodiment, the chords are drawn from left to right or right to left depending on relative positions of each of the identified continuous sclera edge pixels and edges (e.g., in FIG. 7, chords represented with solid lines are drawn from right to left and the chords represented with dotted lines are drawn from left to right). The iris is then detected in the predetermined region using the chords. In one exemplary implementation, the chords which are adjacent to each other are grouped. For example, each group is assigned a group number. In one exemplary embodiment, the chords passing through multiple edges or sclera pixels are eliminated. In another exemplary embodiment, the chords having lengths that are greater than a maximum length and less than a minimum length are eliminated. The maximum length and minimum length are obtained adaptively. The minimum and maximum lengths for chords, based on eye and face sizes, are used to remove any false detection of glint as edges adjacent to the one or more sets of continuous sclera edge pixels. For example, the maximum length ($CHL_{max}$) and minimum length ($CHL_{min}$) are obtained adaptively using equations:

$$CHL_{min} = (\text{width of the face region})/(4*(3.8)) \text{ and}$$

$$CHL_{max} = (\text{width of the face region})/(4*(3)).$$

The remaining chords which are adjacent to each other are then grouped. Further in this exemplary implementation, the chords with a maximum length in each of the groups are identified and declared as iris diameters. Furthermore, a number of chords subtending candidate iris circles associated with each of the iris diameters is determined. For example, the number of chords subtending candidate iris circles associated with each of the iris diameters is determined using a circular filter. In addition, a candidate iris circle is declared as the iris, if the candidate iris circle includes a maximum number of subtended chords which exceeds a first predetermined value and a percentage of edges on its circumference exceeds a second predetermined value. For example, the first predetermined value is 5 and the second predetermined value is 40%. In one example embodiment, each candidate iris circle having a maximum percentage of the edges on the iris circumference and exceeding the second predetermined value is declared as the iris, if the difference in number of chords between any two groups is less than a third predetermined value. For example, the third predetermined value is two. In another example embodiment, each candidate iris circle having a maximum number of edges on the iris circumference is declared as the iris, if the difference in a percentage of edges on the iris circumferences between two candidate iris circles is less than a predetermined threshold. For example, the predetermined threshold is 7%.

Figure 8:
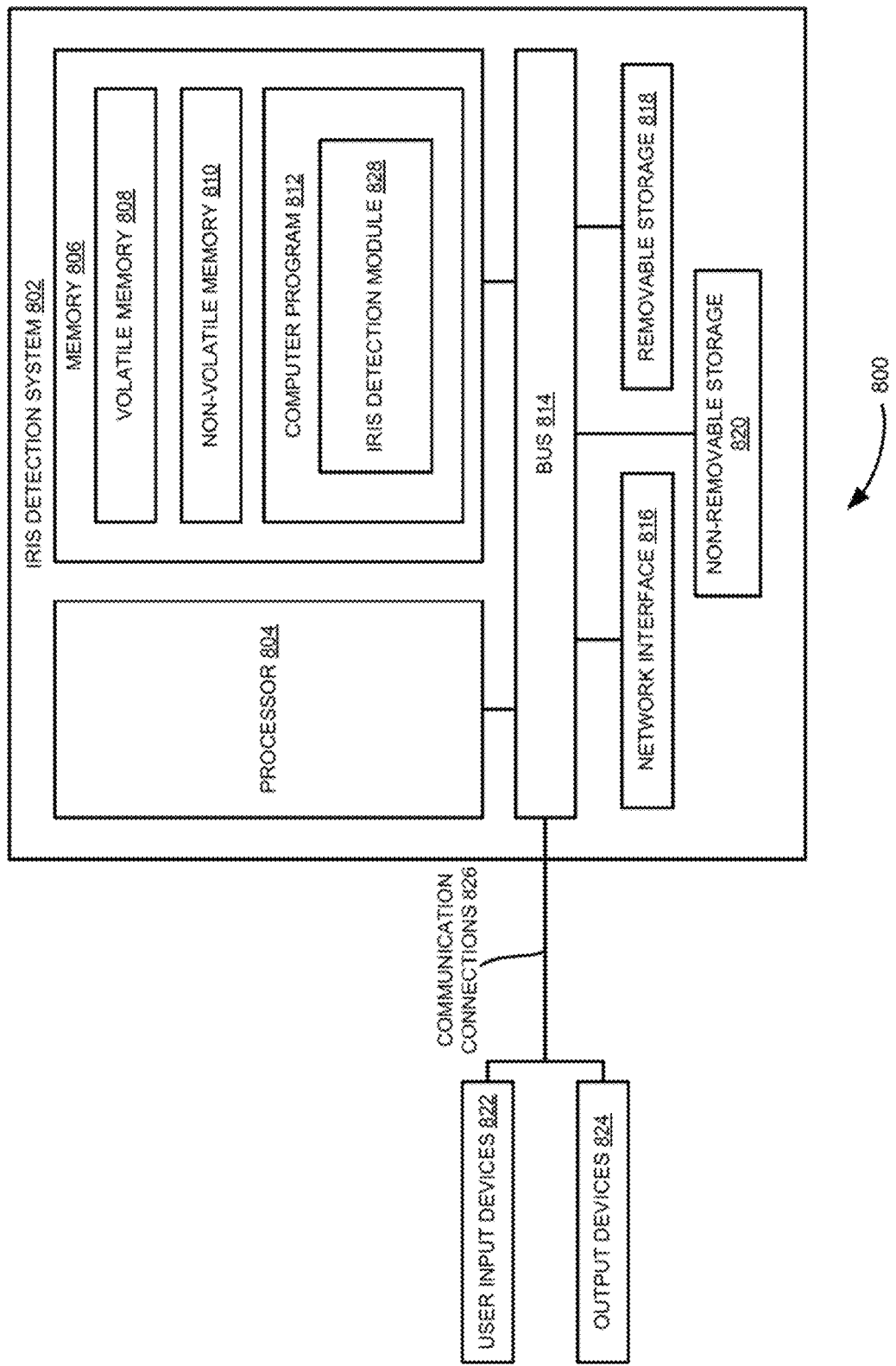
FIG. 8 illustrates an iris detection system for detecting iris in the digital image, using the process of FIG. 1, according to one embodiment.

Referring now to FIG. 8, which illustrates an iris detection system 802 for detecting iris in a digital image, using the process of FIG. 1, according to one embodiment. FIG. 8 and the following discussions are intended to provide a brief, general description of a suitable computing environment in which certain embodiments of the inventive concepts contained herein are implemented.

The iris detection system 802 includes a processor 804, memory 806, a removable storage 818, and a non-removable storage 820. The iris detection system 802 additionally includes a bus 814 and a network interface 816. As shown in FIG. 8, the iris detection system 802 includes access to the computing system environment 800 that includes one or more user input devices 822, one or more output devices 824, and one or more communication connections 826 such as a network interface card and/or a universal serial bus connection.

Exemplary user input devices 822 include a digitizer screen, a stylus, a trackball, a keyboard, a keypad, a mouse and the like. Exemplary output devices 824 include a display unit of the personal computer, a mobile device, and the like. Exemplary communication connections 826 include a local area network, a wide area network, and/or other network.

The memory 806 further includes volatile memory 808 and non-volatile memory 810. A variety of computer-readable storage media are stored in and accessed from the memory elements of the iris detection system 802, such as the volatile memory 808 and the non-volatile memory 810, the removable storage 818 and the non-removable storage 820. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 804, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 804 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 804 of the iris detection system 802. For example, a computer program 812 includes machine-readable instructions capable for detecting the iris in the digital image, according to the teachings and herein described embodiments of the present subject matter. In one embodiment, the computer program 812 is included on a compact disk-read only memory (CD-ROM) and loaded from the CD-ROM to a hard drive in the non-volatile memory 810. The machine-readable instructions cause the iris detection system 802 to encode according to the various embodiments of the present subject matter.

As shown, the computer program 812 includes an iris detection module 828. For example, the iris detection module 828 can be in the form of instructions stored on a non-transitory computer-readable storage medium. The non-transitory computer-readable storage medium having the instructions that, when executed by the iris detection system 802, causes the iris detection system 802 to perform the method described in FIG. 1.

In one embodiment, the iris detection module 828 detects the iris in a face region of the digital image using eye features, such as a shape of the iris, luminance values of a sclera region and the like. In one exemplary embodiment, the iris detection module 828 detects edges in a predetermined region of the face region. For example, the predetermined region is from about 25% to about 50% of the face region. In context, the iris detection module 828 detects the edges in the predetermined region using a threshold value obtained adaptively from a histogram of luminance values within the predetermined region. For example, the threshold value is obtained adaptively using an equation:

$$T_{eye} = \text{Scale\_Y\_factor}_{eye} * (t_{y2} - t_{y1})$$

wherein, Scale_Y_factor$_{eye}$=2.5,
$t_{y2}$=Y value at 75% of the histogram, and
$t_{y1}$=Y value at 25% of the histogram.

Further, the iris detection module 828 detects eye regions in the predetermined region based on the detected edges. In one exemplary implementation, the iris detection module 828 partitions the predetermined region into multiple overlapping windows. The iris detection module 828 then determines a number of the detected edges in each overlapping window. The iris detection module 828 then identifies and declares two of the multiple overlapping windows having a maximum number of the detected edges as the eye regions.

Furthermore, the iris detection module 828 identifies one or more sets of continuous sclera edge pixels in the eye regions. In one embodiment, the iris detection module 828 detects sclera pixels in the eye regions. For example, the iris detection module 828 detects the sclera pixels in the eye regions using an adaptive threshold value ($T_{SCLERA}$) derived from a histogram of luminance values within the eye regions. In this context, the iris detection module 828 declares any pixel whose luminance value is greater than the threshold value based on the histogram as the sclera pixel. The threshold value is obtained using an equation:

$$T_{SCLERA} \geq (Y_{SCR\%})$$

wherein, $Y_{SCR\%}$=Y value at which 85% of the histogram is covered.

Further in this embodiment, the iris detection module 828 identifies sclera edge pixels from the detected sclera pixels. The sclera edge pixels are the sclera pixels that are next to the edges. Furthermore, the iris detection module 828 identifies the one or more sets of continuous sclera edge pixels from the identified sclera edge pixels. In one exemplary implementation, the iris detection module 828 identifies the one or more sets of continuous sclera edge pixels using an n×m filter that detects sclera edge pixels in its top and bottom portions. For example, the n×m filter is a 7×3 filter, centered on a sclera edge pixel, which checks for a predetermined number of sclera edge pixels in top 3×3 and bottom 3×3 portions. In one example embodiment, the predetermined number is one. Further, the iris detection module 828 marks the sclera edge pixel on which the filter is centered as a continuous sclera edge pixel, if the number of sclera edge pixels in the top and bottom 3×3 portions of the filter exceeds the predetermined number. The iris detection module 828 repeats the above process for each sclera edge pixel. In this context, the iris detection module 828 identifies the one or more sets of continuous sclera edge pixels, which represent iris contours, using the n×m filter in the vertical direction and eliminates remaining sclera edge pixels.

In addition, the iris detection module 828 detects the iris in the predetermined region using the one or more identified sets of continuous sclera edge pixels. In one example embodiment, the iris detection module 828 draws chords starting from edges that are adjacent to the one or more identified sets of continuous sclera edge pixels and ending on edges. In one example embodiment, the iris detection module 828 draws the chords from left to right or right to left depending on relative positions of each of the identified continuous sclera edge pixels and edges. The iris detection module 828 then detects the iris in the predetermined region using the chords. In one exemplary implementation, the iris detection module 828 groups the chords which are adjacent to each other. For example, each group is assigned a group number. In one exemplary embodiment, the chords passing through multiple edges or sclera pixels are eliminated. In another exemplary embodiment, the iris detection module 828 eliminates the chords having lengths that are greater than a maximum length and less than a minimum length. The maximum length and minimum length are obtained adaptively. For example, The maximum length (CHL$_{max}$) and minimum length (CHL$_{min}$) are obtained adaptively using equations:

$$CHL_{min} = \text{(width of the face region)}/(4*(3.8)) \text{ and}$$

$$CHL_{max} = \text{(width of the face region)}/(4*(3)).$$

The iris detection module 828 then groups the remaining chords which are adjacent to each other. Further in this exemplary implementation, the iris detection module 828 identifies and declares the chords with a maximum length in each of the groups as iris diameters. Furthermore, the iris detection module 828 determines a number of chords subtending candidate iris circles associated with each of the iris diameters. For example, the iris detection module 828 determines the number of chords subtending candidate iris circles associated with each of the iris diameters using a circular filter.

In addition, the iris detection module 828 declares a candidate iris circle as the iris, if the candidate iris circle includes a maximum number of subtended chords which exceeds a first predetermined value and a percentage of edges on its circumference exceeds a second predetermined value. For example, the first predetermined value is 5 and the second predetermined value is 40%. In one example embodiment, the iris detection module 828 declares each candidate iris circle having a maximum percentage of the edges on the iris circumference and exceeding the second predetermined value as the iris, if the difference in number of chords between any two groups is less than a third predetermined value. For example, the third predetermined value is two. In another example embodiment, the iris detection module 828 declares each candidate iris circle having a maximum number of edges on the iris circumference as the iris, if the difference in a percentage of edges on the iris circumferences between two candidate iris circles is less than a predetermined threshold. For example, the predetermined threshold is 7%.

In various embodiments, the systems and methods described in FIGS. 1 through 8 propose a technique for detecting the iris in the face region of the digital image. The above proposed technique is capable of detecting the iris under varying light conditions, tilt levels and also under different iris colors.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for iris detection in a digital image, comprising:
   detecting iris in a face region of the digital image using eye features including a shape of using including the iris and luminance values of a sclera region, comprising
      detecting edges in a predetermined region of the face region;
      detecting eye regions in the predetermined region based on the detected edges;
      detecting sclera pixels in the eye regions using an adaptive threshold value derived from a histogram of luminance values within the eye regions;
      identifying sclera edge pixels as sclera pixels that are next to the edges from the detected sclera pixels;
      identifying one or more sets of continuous sclera edge pixels that are next to the detected edges in the eye regions from the identified sclera edge pixels; and
      detecting the iris in the predetermined region using the one or more identified sets of continuous sclera edge pixels.

2. The method of claim 1, wherein detecting the eye regions in the predetermined region based on the detected edges, comprises:
   partitioning the predetermined region into multiple overlapping windows;
   determining a number of the detected edges in each overlapping window; and
   identifying and declaring two of the multiple overlapping windows having a maximum number of the detected edges as the eye regions.

3. The method of claim 1, wherein identifying the one or more sets of continuous sclera edge pixels from the identified sclera edge pixels, comprises:
   identifying the one or more sets of continuous sclera edge pixels from the identified sclera edge pixels using alt n×m filter.

4. The method of claim 3, wherein detecting the iris in the predetermined region rising the one or more identified sets of continuous sclera edge pixels, comprises:
   drawing chords starting from edges that are adjacent to the one or more identified sets of continuous sclera edge pixels and ending on edges; and
   detecting the iris in the predetermined region using the chords.

5. The method of claim 4, wherein the chords are drawn from left to right or right to left depending on relative positions of the identified continuous sclera edge pixels and edges.

6. The method of claim 1, wherein detecting the edges in the predetermined region, comprises:
   detecting the edges in the predetermined region using a threshold value obtained adaptively from a histogram of luminance values within the predetermined region.

7. The method of claim 1, wherein the predetermined region is from 25% to 50% of the face region.

8. A method for iris detection in a digital image, comprising:
   detecting iris in a face region of the digital image using eye features including a shape of the iris and luminance values of a sclera region, comprising:
      detecting edges in a predetermined region of the face region;
      detecting eye regions in the predetermined region based on the detected edges;
      detecting sclera pixels in the eye regions;
      identifying sclera edge pixels as sclera pixels that are next to the edges from the detected sclera;
      identifying the one or more sets of continuous sclera edge pixels that are next to the detected edges in the eye regions from the identified sclera edge pixels;
      drawing chords starting from edges that are adjacent to the one or more identified sets of continuous sclera edge pixels and ending on edges;
      grouping the chords which are adjacent to each other;
      identifying and declaring the chords with a maximum length in each of the groups as iris diameters;
      determining a number of chords subtending candidate iris circles associated with each of the iris diameters; and
      declaring each candidate iris circle as the iris, if the candidate iris circle includes a maximum number of subtended chords which exceeds a first predetermined value and a percentage of edges on its circumference exceeds a second predetermined value.

9. The method of claim 8, further comprising:
   declaring each candidate iris circle having a maximum percentage of the edges on an iris circumference and exceeding the second predetermined value as the iris, if the difference in the number of chords between any two groups is less than a third predetermined value.

10. The method of claim 9, further comprising:
    declaring each candidate iris circle having a maximum number of edges on the iris circumference as the iris, if difference in a percentage of edges on the iris circumferences between two candidate iris circles is less than a predetermined threshold.

11. An iris detection system, comprising:
    a processor; and
    memory coupled to the processor, wherein the memory includes an iris detection module to:
       detect iris in a face region of a digital image using eye features including a shape of the iris and luminance values of a sclera region, wherein the iris detection module is configured to:
          detect edges in a predetermined region of the face region;
          detect eye regions in the predetermined region based on the detected edges;
          detect sclera pixels in the eye regions using an adaptive threshold value derived from a histogram of luminance values within the eye regions;
          identify sclera edge pixels as sclera pixels that are next to the edges from the detected sclera pixels;
          identify one or more sets of continuous sclera edge pixels that are next to the detected edges in the eye regions from the identified sclera edge pixels; and
          detect the iris in the predetermined region using the one or more identified sets of continuous sclera edge pixels.

12. The system of claim 11, wherein the iris detection module is configured to:
    partition the predetermined region into multiple overlapping windows;
    determine a number of the detected edges in each overlapping window; and
    identify and declare two of the multiple overlapping windows having a maximum number of the detected edges as the eye regions.

13. The system of claim 11, wherein the iris detection module is configured to:

identify the one or more sets of continuous sclera edge pixels from the identified sclera edge pixels using an n×m filter.

14. The system of claim 13, wherein the iris detection module is configured to:
draw chords starting from edges that are adjacent to the one or more identified sets of continuous sclera edge pixels and ending on edges; and
detect the iris in the predetermined region using the chords.

15. An iris detection system, comprising:
a processor; and
memory coupled to the processor, wherein the memory includes an iris detection module to:
detect iris in a face region of a digital image using eye features including a shape of the iris and luminance values of a sclera region, wherein the iris detection module is configured to:
detect edges in a predetermined region of the face region;
detect eye regions in the predetermined region based on the detected edges;
detect sclera pixels in the eye regions;
identify sclera edge pixels as sclera pixels that are next to the edges from the detected sclera pixels;
identify one or more sets of continuous sclera edge pixels that are next to the detected edges in the eye regions from the identified sclera edge pixels;
draw chords starting from edges that are adjacent to the one or more identified sets of continuous sclera edge pixels and ending on edges;
group the chords which are adjacent to each other;
identify and declare the chords with a maximum length in each of the groups as iris diameters;
determine a number of chords subtending candidate iris circles associated with each of the iris diameters; and
declare each candidate iris circle as the iris, if the candidate iris circle include a maximum number of subtended chords which exceeds a first predetermined value and a percentage of edges on its circumference exceeds a second predetermined value.

16. The system of claim 15, wherein the iris detection module is further configured to:
declare each candidate iris circle having a maximum percentage of the edges on an iris circumference and exceeding the second predetermined value as the iris, if the difference in the number of chords between any two groups is less than a third predetermined value.

17. The system of claim 16, wherein the iris detection module is further configured to:
declare each candidate iris circle having a maximum number of edges on the iris circumference as the iris, if difference in a percentage of edges on the iris circumferences between two candidate iris circles is less than a predetermined threshold.

18. A non-transitory computer-readable storage medium having instructions that, when executed by a computing device, cause the computing device to:
detect iris in a face region of a digital image using eye features including a shape of the iris and luminance values of a sclera region, comprising:
detect edges in a predetermined region of the face region;
detect eye regions in the predetermined region based on the detected edges;
detecting sclera pixels in the eye regions using an adaptive threshold value derived from a histogram of luminance values within the eye regions;
identifying sclera edge pixels as sclera pixels that are next to the edges from the detected sclera pixels;
identify one or more sets of continuous sclera edge pixels that are next to the detected edges in the eye regions from the identified sclera edge pixels; and
detect the iris in the predetermined region using the one or more identified sets of continuous sclera edge pixels.

19. The non-transitory computer-readable storage medium of claim 18, wherein the instructions cause the computing device to:
partition the predetermined region into multiple overlapping windows;
determine a number of the detected edges in each overlapping window; and
identify and declare two of the multiple overlapping windows having a maximum number of the detected edges as the eye regions.

20. The non-transitory computer-readable storage medium of claim 18, wherein the instructions cause the computing device to:
identify the one or more sets of continuous sclera edge pixels from the identified sclera edge pixels using an n×m filter.

21. The non-transitory computer-readable storage medium of claim 20, wherein the instructions cause the computing device to:
draw chords starting from edges that are adjacent to the one or more identified sets of continuous sclera edge pixels and ending on edges; and
detect the iris in the predetermined region using the chords.

22. A method for detecting, iris iii a face region of a digital image, comprising:
detecting edges in a predetermined region of the face region;
detecting eye regions in the predetermined region based on the detected edges;
identifying one or more sets of continuous sclera edge pixels that are next to the detected edges in the eye regions;
drawing chords starting from edges that are adjacent to the one or more identified sets of continuous sclera edge pixels and ending on edges;
grouping the chords which are adjacent to each other;
identifying and declaring the chords with a maximum length in each of the groups as iris diameters;
determining a number of chords subtending candidate iris circles associated with each of the iris diameters; and
declaring each candidate iris circle as the iris, when the candidate iris circle includes a maximum number of subtended chords which exceeds a first predetermined value and a percentage of edges on its circumference exceeds a second predetermined value.

23. The method of claim 22, wherein detecting the eye regions in the predetermined region based on the detected edges, comprises:
partitioning the predetermined region into multiple overlapping windows;
determining a number of the detected edges in each overlapping window; and
identifying and declaring two of the multiple overlapping windows having a maximum number of the detected edges as the eye regions.

24. The method of claim 22, wherein identifying the one or more sets of continuous sclera edge pixels that are next to the detected edges in the eye regions, comprises:
- detecting sclera pixels in the eye regions using an adaptive threshold value derived from a histogram of luminance values within the eye regions;
- identifying sclera edge pixels as sclera pixels that are next to the edges from the detected sclera pixels; and
- identifying the one or more sets of continuous sclera edge pixels from the identified sclera edge pixels.

25. An iris detection system for detecting iris in a face region of a digital image, comprising:
- a processor; and
- memory coupled to the processor, wherein the memory includes an iris detection module to:
  - detect edges in a predetermined region of the face region;
  - detect eye regions in the predetermined region based on the detected edges;
  - identify one or more sets of continuous sclera edge pixels that are next to the detected edges in the eye regions;
  - draw chords starting from edges that are adjacent to the one or more identified sets of continuous sclera edge pixels and ending on edges;
  - group the chords which are adjacent to each other;
  - identify and declare the chords with a maximum length in each of the groups as iris diameters;
  - determine a number of chords subtending candidate iris circles associated with each of the iris diameters; and
  - declare each candidate iris circle as the iris, when the candidate iris circle include a maximum number of subtended chords which exceeds a first predetermined value and a percentage of edges on its circumference exceeds a second predetermined value.

26. The system of claim 25, wherein the iris detection module is configured to:
- partition the predetermined region into multiple overlapping windows;
- determine a number of the detected edges in each overlapping window; and
- identify and declaring two of the multiple overlapping windows having a maximum number of the detected edges as the eye regions.

27. The system of claim 25, wherein the iris detection module is configured to:
- detect sclera pixels in the eye regions using an adaptive threshold value derived from a histogram of luminance values within the eye regions;
- identify sclera edge pixels as sclera pixels that are next to the edges from the detected sclera pixels; and
- identify the one or more sets of continuous sclera edge pixels from the identified sclera edge pixels.

28. A non-transitory computer-readable storage medium having instructions that, when executed by a computing device, cause the computing device to perform a method for detecting iris in a face region of a digital image, the method comprising:
- detecting edges in a predetermined region of the face region;
- detecting eye regions in the predetermined region based on the detected edges;
- identifying one or more sets of continuous sclera edge pixels that are next to the detected edges in the eye regions;
- drawing chords starting from edges that are adjacent to the one or more identified sets of continuous sclera edge pixels and ending on edges;
- grouping the chords which are adjacent to each other;
- identifying and declaring chords with a maximum length in each of the groups as iris diameters;
- determining a number of chords subtending candidate iris circles associated with each of the iris diameters; and
- declaring each candidate iris circle as the iris, when the candidate iris circle includes a mum number of subtended chords which exceeds a first predetermined value and a percentage of edges on its circumference exceeds a second predetermined value.

29. The non-transitory computer-readable storage medium of claim 28, wherein detecting the eye regions in the predetermined region based on the detected edges, comprises:
- partitioning the predetermined region into multiple overlapping windows;
- determining a number of the detected edges in each overlapping window; and
- identifying and declaring two of the multiple overlapping windows having a maximum number of the detected edges as the eye regions.

30. The non-transitory computer-readable storage medium of claim 28, wherein identifying the one or more sets of continuous sclera edge pixels that are next to the detected edges in the eye regions, comprises:
- detecting sclera pixels in the eye regions using an adaptive threshold value derived from a histogram of luminance values within the eye regions;
- identifying sclera edge pixels as sclera pixels that are next to the edges from the detected sclera pixels; and
- identifying the one or more sets of continuous sclera edge pixels from the identified sclera edge pixels.

* * * * *